United States Patent
Umeda et al.

(10) Patent No.: US 6,908,103 B2
(45) Date of Patent: Jun. 21, 2005

(54) SYSTEM TO MONITOR COURSE OF A MOVING OBJECT GOING TO COLLIDE AND SAFETY DEVICE AGAINST CRASHES FOR A MOTORCYCLE WHICH USES THE SYSTEM

(76) Inventors: Makoto Umeda, 2243-199, Shimosuzurikawamachi, Kumamoto-shi, Kumamoto (JP); Shinichi Yamaguchi, 4-51, Tsukide 3-chome, Kumamoto-shi, Kumamoto (JP); Koichiro Tomari, 28-18, Kengunhonmachi, Kumamoto-shi, Kumamoto (JP)

( * ) Notice: Subject to any disclaimer, the term of this patent is extended or adjusted under 35 U.S.C. 154(b) by 89 days.

(21) Appl. No.: 10/194,612

(22) Filed: Jul. 12, 2002

(65) Prior Publication Data

US 2003/0023361 A1 Jan. 30, 2003

(30) Foreign Application Priority Data

Jul. 17, 2001 (JP) .......................... 2001-216967

(51) Int. Cl.⁷ .................. B60R 21/22; B60R 21/26; B60R 21/32
(52) U.S. Cl. .................. 280/730.1; 280/735; 280/737; 340/435; 2/462
(58) Field of Search ............... 280/730.1, 735, 280/737; 340/435, 436, 903, 904; 342/72, 455; 701/45, 301; 2/462, 463, 464

(56) References Cited

U.S. PATENT DOCUMENTS

| | | | | |
|---|---|---|---|---|
| 3,861,710 A | * | 1/1975 | Okubo | 280/735 |
| 4,073,359 A | * | 2/1978 | Fujiki et al. | 342/71 |
| 5,746,442 A | * | 5/1998 | Hoyaukin | 280/730.1 |
| 5,872,536 A | * | 2/1999 | Lyons et al. | 342/70 |
| 6,139,050 A | * | 10/2000 | Bultel et al. | 280/730.1 |
| 6,433,691 B1 | * | 8/2002 | Hilliard et al. | 340/573.1 |

FOREIGN PATENT DOCUMENTS

GB 2305352 A * 4/1997 .......... A41D/13/00

* cited by examiner

Primary Examiner—Peter C. English
(74) Attorney, Agent, or Firm—Koda & Androlia

(57) ABSTRACT

A safety device against a crash for a motorcycle is equipped with an air jacket, a cartridge and an opening device. Before the moving motorcycle collides with an obstacle existing ahead, a control signal is outputted and the opening device is operated when a first condition where interval between the motorcycle and the obstacle becomes a certain distance, and a second condition where relative velocity of the motorcycle toward the obstacle becomes over a certain value, are fulfilled. When this occurs, a seal plate of the cartridge is opened and pressurized gas filled in the cartridge flows into and expands an airbag of the air jacket whereby a rider of the moving motorcycle is protected.

4 Claims, 12 Drawing Sheets

SYSTEM TO MONITOR COURSE OF A MOVING OBJECT GOING TO COLLIDE AND SAFETY DEVICE AGAINST CRASHES FOR A MOTORCYCLE WHICH USES THE SYSTEM

BACKGROUND OF THE INVENTION

1. Technical Field of the Invention

This invention relates to a system to detect a traffic accident involving crash by monitoring an object to be collided with (for example, an obstacle existing in a direction to which a motorcycle moves) existing in direction to which an object such as a motorcycle going to collide moves, and also relates to a safety device against crashes for a motorcycle which uses a system to protect a rider of the motorcycle from shock of the crash.

2. Prior Art

Currently, as cars are popularized, traffic accidents become one of great social problems. Among traffic accidents, especially traffic accidents involving crashes of motorcycles in which riders are directly knocked down on the roads cause a high death rate and a serious problem.

Lately, to decrease the death rate of traffic accidents involving the crash of motorcycles, various studies or experiments have been conducted. Through such a crash experiment in which this inventor has participated, the rider's condition just after the crash of the motorcycle with a car has been observed at points in time P, Q, R, S, T and U (ref. FIG. 13), and such tests have clarified that the rider suffers the first shock in the first 50 millisecond (at point Q in FIG. 13) after impact. Here, this crash experiment was conducted according to the experiment definition of ISO13232-2.

On the other hand, to decrease the death rate of traffic accidents involving the crash of motorcycles, safety devices against crashes for a motorcycle to protect a rider of the motorcycle from the shock of a traffic accident involving a crash have been proposed. Known safety devices against the crash for a motorcycle, for example, are such as that composed of an air jacket to be worn by a rider, a gas cartridge filled with gas to be injected to the air jacket, and an inflater to get the gas out of the gas cartridge at the crash. According to that type of safety device against a crash for a motorcycle, the inflater is equipped with a starter pin, and as the starter pin is pulled off, the cartridge is opened with a hole whereby gas flows out to the air jacket. Further, the inflater and the gas cartridge are put on the air jacket as one body, the starter pin is put on the motorcycle, and in the traffic accident involving a crash, at the moment when the rider is thrown off from the motorcycle the inflater works so that the air jacket expands.

However, according to the above-described prior safety device against the crash for a motorcycle, there is a problem that the time required for the air jacket to expand after the inflater starts to work is much longer than the time from the moment of impact when the rider suffers the first shock. In FIG. 12, the condition of the air jacket of the prior safety device against a crash for a motorcycle is shown as time passes from the moment when the inflater starts to work. As shown in FIG. 12, the air jacket of the prior safety device against a crash requires about 200 milliseconds from the moment it starts working to get enough inner pressure (about 20 kilopascal) to absorb the shock. But, in 100 milliseconds just after the moment of impact, the rider has already suffered a shock on the chest or head, and further, it is generally believed this shock is very dangerous because of high possibility of a fatal wound. Therefore, to decrease the death rate in an accident, in early stage of a traffic accident involving a crash, preferably before the crash occurs, action against the crash has to be taken.

Accordingly, the present invention aims to provide a system to monitor the course of an object going to collide which enables the system to take an action against the crash by perceiving the crash before it occurs in an early stage of a traffic accident involving the crash, and to provide a safety device against the crash of a motorcycle using the system.

SUMMARY OF THE INVENTION

A system to monitor the course of an object going to collide in which a control signal is outputted in case a first condition where the interval between a moving object (a motorcycle) going to collide and an object to be collided with which exists on the course of said object going to collide becomes a certain distance, and a second condition where a relative velocity of said object going to collide toward said object to be collided with becomes greater than certain value, are both fulfilled.

According to this system to monitor the course of an object going to collide, by detecting the interval between an object going to collide and an object to be collided with and the relative velocity of the object going to collide to the object to be collided with, it becomes possible to recognize that the object going to collide suddenly approaches the object to be collided with. Then, as the certain values of the interval and the relative velocity are set at values wherein it is impossible to avoid a crash, the control signal is outputted at a sudden approaching stage just before the moment of impact, and by using the control signal it becomes possible to take action against the crash in an early stage of a traffic accident. Further, since the crash of the object going to collide to the object to be collided with is to be perceived based on the relative velocity of the object going to collide to the object to be collided with in addition to the interval between them, it is possible to avoid outputting erroneous control signal in case where both moving the object going to collide and moving the object to be collided with such as running cars which approach without the danger of a crash, reliability can be improved.

Preferably, said interval may be detected by a sensor having more than two certain different sensing points arranged on straight line in a direction to which said object going to collide moves, and said relative velocity may be detected by using the time lag detected between a point further from and a point nearer to said object going to collide.

In this case, since just detecting only the interval between the object going to collide and the object to be collided with results in detecting the relative velocity at the same time, no other measuring is not required and the structure can be simplified and miniaturized.

Preferably, said interval may be detected by two sensors having more than two certain different sensing points arranged on two parallel straight lines in a direction in which said object going to collide moves, among said sensing points the point furthest from and the point nearest to said object going to collide may be detected by said two sensors respectively, said relative velocity may be detected by using the time lag detected between said point farthest from and said point nearest to said object going to collide, and the control signal may be outputted in case said fist condition, said second condition, and the third condition where all of said sensing points are detected in order from the point farthest from to the point nearest to said object going to collide, are fulfilled.

In this case, as the furthest point and the nearest point are respectively detected by different sensors, even in such a situation that either of the sensors accidentally operates in error by influence of diffused reflection and so on, the number of errors of whole system can be decreased. Further, as it is made to be required condition to output the control signal that more than one sensing point are detected in order from the farthest point to the nearest point, erroneous operation can be avoided in such a situation that the object going to collide approaches and steps aside from an object existing in the direction of movement, for example, a situation that a motorcycle approaches a side of and passes a car running ahead.

Preferably, more than one sensor having a certain sensing point in a direction to which said object going to collide may be equipped, each of said sensors respectively may have said sensing point at a distance from said object going to collide which distances are different from each other, said interval may be detected by at least one of said sensors, said relative velocity may be detected by using the time lag detected between the point furthest from and the point nearest to said object going to collide, and control signal may be outputted in case said first condition, said second condition, and the third condition where all of said sensing points are detected in order from the point farthest from to the point nearest to said object going to collide, are fulfilled.

In this case, by using the sensor not having more than one sensing point, effect of decreasing the occurrence of accidental erroneous operation of whole system, and effect of avoiding the erroneous operation in a situation that the object going to collide approaches and steps aside from an object existing in the direction of movement can be obtained. Further, by increasing the number of the sensors, it is possible to improve the effect of decreasing the occurrence of accidental erroneous operation caused by influence of diffused reflection and so on.

Preferably, said interval may be detected by a sensor which detects distance between two different points, and said relative velocity may be detected by using variation of said interval.

In this case, it is possible to use the sensor not having more than one sensing point. Further, as it does not use more than one sensor, it can be miniaturized.

Preferably, said sensor may be selected from laser sensor, infrared light sensor, ultrasonic wave sensor, LED sensor, or combination sensor of more than two of these sensors.

In this case, by using conventional sensors low cost production can be achieved. Further, by using a combination of more than two types of sensors, for example, by using the ultrasonic wave sensor to detect frequency between sensing points of the laser sensor having more than one sensing point, each of the sensors compensates for weak points of other types of sensors and reliability can be improved.

Preferably, said sensor may be a laser sensor equipped with means to detect intensity of illumination.

In this case, such a condition where the laser sensor is easily influenced by sun light tends to cause an error, namely, a condition in the morning or the evening in which the angle of the sun is low, or other condition where diffused reflection tends to occur, can be detected by using the means to detect intensity of illumination, and it is possible to turn off the laser sensors and to prevent the laser sensor from erroneous operation. Then, the laser sensor which shows superior characteristics as a detect means can be used effectively.

Preferably, a system to monitor the course of an object going to collide in accordance with the present invention may be for monitoring the course of a motorcycle, and said certain distance of said interval at said first condition may be from 1 to 3 meters.

In this case, at ordinary running condition of a motorcycle, in spite of using conventional sensors, i.e., laser sensor, infrared light sensor, ultrasonic wave sensor or LED sensor, the crash can be perceived with good accuracy and enough time to take action against the crash can be obtained by the moment of impact of the motorcycle. Here, as the certain distance of interval is longer the time obtained by the moment of impact becomes longer. However, the sensor is required to have high accuracy and there are fears that cost will increase and structure will be more complicated. On the other hand, as the certain distance of interval is shorter the sensor not having high accuracy can be used. However, the time obtained by the moment of impact becomes shorter and there is a fear that enough action cannot be taken.

Preferably, a system to monitor the course of an object going to collide in accordance with the present invention may be for monitoring the course of a motorcycle, and said certain value of said relative velocity at said second condition may be from 20 to 70 kilometers per hour.

In this case, it is possible to monitor the course of a motorcycle suiting for actual conditions of ordinary running of motorcycles. Here, in case where the certain value of the relative velocity is set at too low value, there is fear that too sensitive operation occurs. On the other hand, in case where the certain value is set at too high value, there is fear that practical usage becomes impossible at normal road where running at extreme high speed is prohibited. However, in the case where it is required to protect riders at special condition such as auto race, car stunt and so on, according to the running condition the manufacturer assumes the certain value may be set at, for example, 150 kilometers per hour.

Preferably, a system to monitor the course of the object going to collide in accordance with the present invention may be for monitoring the course of a motorcycle, and said control signal may be outputted in case said first condition, said second condition, and fourth condition where velocity of said motorcycle becomes greater than certain value, are fulfilled.

In this case, by setting the lower limit of the velocity at which the control signal is outputted, unnecessary operation at low speed where the motorcycle runs without danger can be prevented. Further, in most of cases where collision occurs at low speed, because it is quite often that the motorcycle can run to a safe place by itself without falling, a minor accident is prevented from developing to a serious accident by expanding an air jacket in such a case.

Here at the fourth condition, an upper limit of the velocity at which the control signal is outputted is not always necessary, however, the upper limit may be set at the limiting point to achieve the objective of this invention. Namely, as the time from when the sensor detects the obstacle to when the crash of the motorcycle to the obstacle occurs is shortened inversely proportional to the running velocity, and in case where the running velocity becomes greater than certain value, it is impossible to obtain the time required from when signal is input for starting of operation to when the safety device against a crash becomes to function fully, therefore, the certain value of the running velocity in this case may be set as the upper limit. In this case, it is possible to make the system more safe by using the upper limit, for example, by making a limiter work at the upper limit which limiter forces the motorcycle to decrease running velocity. Here, the time required for the conventional safety device against a crash to be in condition to function fully is about 200 millisecond as described above. However, this time is thought to be shortened by technical improvement in future. After such improvement, as the upper limit can be set at higher value, and applicable area of this system to monitor the course of an object going to collide can be widen further. However, though it can meet the requirement at high velocity mechanically the limitation of strength of human body has to be considered, and therefore it is not preferable to set the upper limit at high value infinitely.

Preferably, said certain value of said velocity at said fourth condition may be 15 kilometers per hour. In this case, by setting the lower limit of the velocity at 15 kilometers per hour, it is possible to make the operating condition suit for actual conditions of ordinary running of motorcycles.

A safety device against a crash for a motorcycle in accordance with the present invention is characterized in that air jacket, cartridge, and opening device are provided, said air jacket having an airbag, said cartridge being filled with pressurized gas and sealed up by seal plate at its opening, said opening device opening said seal plate of said cartridge and provided with gas flow-out mouth, said airbag being connected to said opening device, and in that before the running motorcycle collides to an obstacle existing ahead, said opening device operates in case the first condition where interval between said motorcycle and said obstacle becomes a certain distance, and the second condition where relative velocity of said motorcycle toward said obstacle becomes greater than a certain value, are fulfilled.

According to this safety device against a crash for a motorcycle, by detecting the interval between a motorcycle and an obstacle and relative velocity of the motorcycle to the obstacle, it becomes possible to recognize the motorcycle suddenly approaching the obstacle. Then, as the certain values of the interval and the relative velocity are set at the values wherein it is impossible to avoid a crash, at sudden approaching stage before the moment of impact the opening device operates whereby the air jacket starts to expand, inner pressure of the air jacket is raised at the moment when a rider suffers a first shock, and therefore the rider can be protected well. Further, as the crash of the motorcycle to the obstacle is to be perceived based on the relative velocity of the motorcycle to the obstacle in addition to the interval of them, erroneous operation can be prevented in case where running the motorcycle approaches the running obstacle such as a running car without danger of a crash, and reliability can be improved.

Preferably, as the safety device against a crash for a motorcycle in accordance with the present invention, said certain distance of said interval at said first condition is from 1 to 3 meters. The effect obtained in this case is same as one described above as the system to monitor the course of an object going to collide.

Preferably, as a safety device against a crash for a motorcycle in accordance with the present invention, said certain value of said relative velocity at said second condition may be from 20 to 70 kilometers per hour. The effect obtained in this case is same as one described above as the system to monitor the course of an object going to collide.

Preferably, as a safety device against a crash for a motorcycle in accordance with the present invention, said opening device may work in case said first condition, said second condition, and fourth condition where velocity of said motorcycle becomes greater than a certain value, are fulfilled. The effect obtained in this case is same as one described above as the system to monitor the course of an object going to collide.

Preferably, as a safety device against a crash for a motorcycle in accordance with the present invention, said certain value of said velocity at fourth condition may be 15 kilometers per hour. The effect obtained in this case is same as one described above as the system to monitor the course of an object going to collide.

Preferably, as a safety device against a crash for a motorcycle in accordance with the present invention, operation of a spare sensor equipped at said motorcycle may become an alternative condition of said first and second conditions in case said first condition and second condition are not fulfilled.

In this case, even on occasion when the sensor (main sensor) to detect the first and second conditions have difficulty operating, operation of the safety device against a crash for motorcycle is guaranteed and reliability of whole device can be improved. Further, by taking a spare sensor whose type differs from the main sensor, it becomes possible to make the spare sensor compensate for weak points of the main sensor, and reliability can be further improved.

Preferably, said spare sensor may be a combination of an acceleration sensor and a contact sensor.

In this case, with the acceleration sensor, the moment of impact of the motorcycle to the obstacle can be detected by using the shock force in any direction, that is, in front, back, right or left side. Further, with a contact sensor, the moment of contact of the motorcycle to the obstacle can be detected. Then, as the main sensor which detects the obstacle existing at a distance from the motorcycle approaches the motorcycle and the sensor whose detecting condition differs from the main sensor are used at the same time, even on occasion when either of the sensors have difficulty in operation, the crash of the motorcycle to the obstacle is surely detected and the reliability of whole device can be further improved. Here, it is preferable to set as the operating condition the velocity of the motorcycle to exceed a certain value (for example, 15 kilometers per hour), because unnecessary operation at low speed running where the motorcycle runs without danger can be prevented and works on purpose by third party such as mischief while stopping also can be prevented. Further, in most of cases where collision occurs at low speed, because it is quite often that the motorcycle can run to a safe place by itself without falling and the possibility of a minor accident developing to a serious accident becomes high on condition where an air jacket expands, it is preferable to avoid its operation.

Preferably, as a safety device against a crash for a motorcycle in accordance with the present invention, said first condition, said second condition, said fourth condition, and operation of spare sensor may be recognized by a control device.

In this case, as each information detected by each of the sensors is processed properly by the control device, reliability of the whole device can be more improved. Here, the control device is, for example, a control board equipped with integrated memory circuit or central processing unit.

Preferably, said opening device may have a solenoid and may open said seal plate by using electromagnetism of said solenoid. In this case, it is possible to open the seal plate with simple control.

Preferably, said opening device may include gunpowder and may open said seal plate by using the power of the explosion of said gunpowder. In this case, in the situation where strong power is required to open the seal plate, necessary and sufficient power can be obtained.

BRIEF DESCRIPTION OF THE DRAWINGS

FIG. 6(a) is a front view and FIG. 6(b) is a left side view.

DETAILED DESCRIPTION OF THE PREFERRED EMBODIMENT

Figure 1:
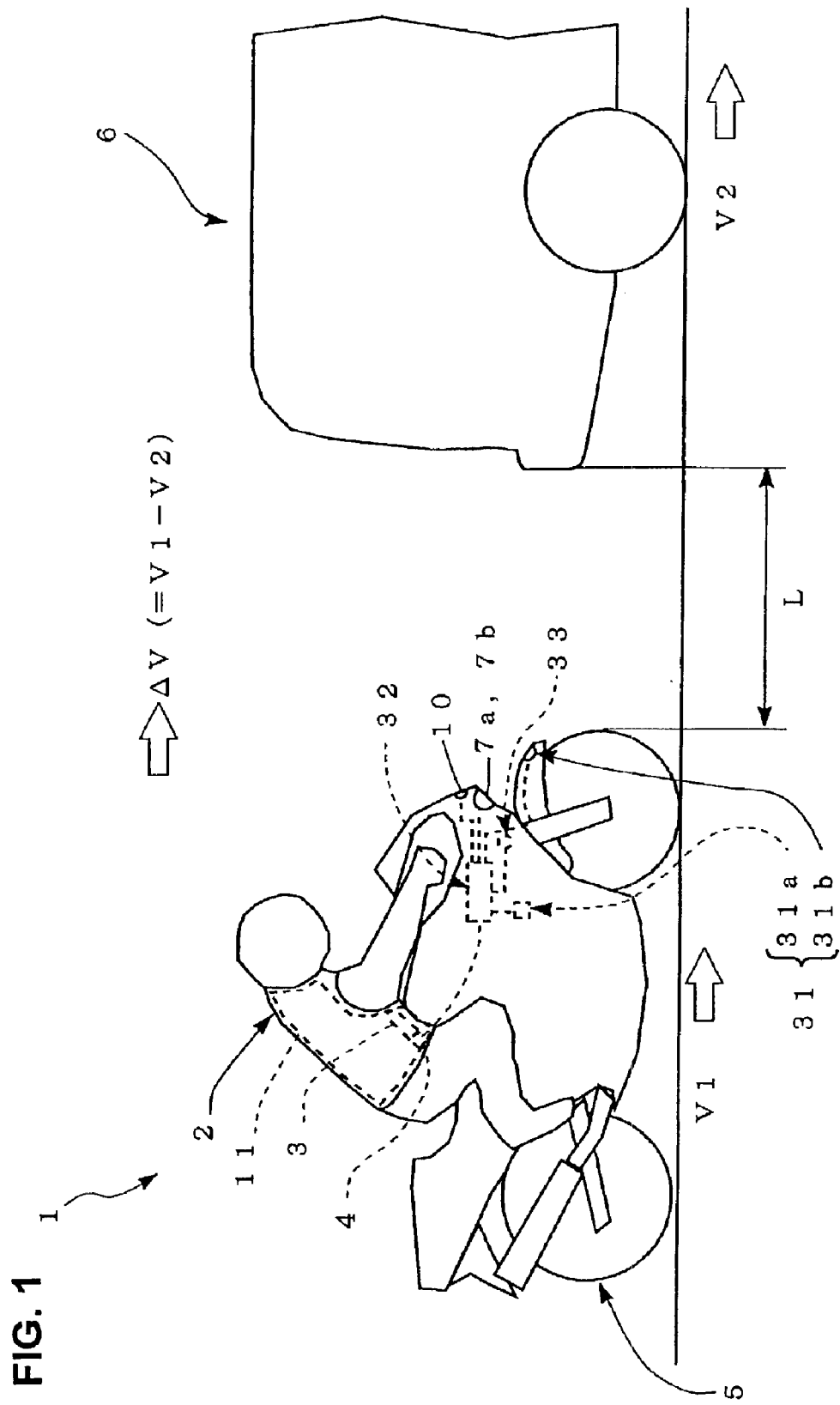
FIG. 1 is a rough drawing of the safety device against a crash for a motorcycle.

In FIGS. 1 to 7, shown is an embodiment of a safety device against a crash for a motorcycle in accordance with the present invention.

A safety device against a crash for a motorcycle 1 is equipped with an air jacket 2, a cartridge 3, and an opening device 4. The air jacket 2 has an airbag 11. The cartridge 3 is filled with pressurized gas and sealed up by a seal plate 12 at its opening. The opening device 4 is to open the seal plate 12 of the cartridge 3 and provided with a gas flow-out mouth 13, and connected to airbag 11. Here, there is no limitation in deciding how to connect, and it is possible to use, for example, the way where connecting is done via manifold to distribute gas flow.

Operation of the opening device 4 is controlled by a system to monitor the course of an object going to collide. Then before a motorcycle 5 running at velocity V1 collides with an obstacle 6 (a car) running ahead at velocity V2, the opening device 4 operates in case the first condition where interval L between the motorcycle 5 and the obstacle 6 becomes a certain distance, and the second condition where difference obtained by subtracting the velocity V2 of the obstacle 6 from the velocity V1 of the motorcycle 5, namely a relative velocity dV of said motorcycle 5 toward the obstacle 6, becomes greater than a certain value, are fulfilled. Here, in case where the velocity V2 of the obstacle 6 is larger than the velocity V1 of the motorcycle 5 the relative velocity dV becomes negative, however, it means the direction in which the motorcycle 5 is going is away from the obstacle 6 and the second condition is not to be fulfilled. Therefore, the opening device 4 does not work. Further, moving of the obstacle 6 is not necessary as the condition by which the opening device 4 is made to start operating. It is to operate naturally if the obstacle 6 is stationary. In such a case, the velocity V2 may be considered to be 0.

Figure 3:
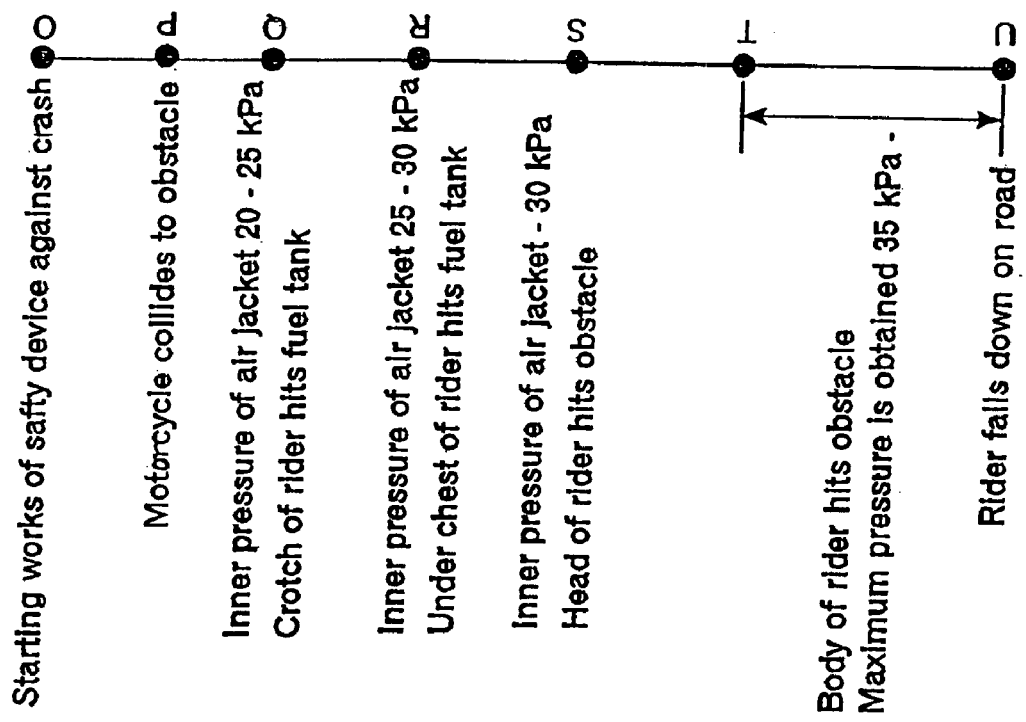
FIG. 3 is a graph showing change of inner pressure of an air jacket of a rider at a traffic accident involving a crash.
Figure 4:
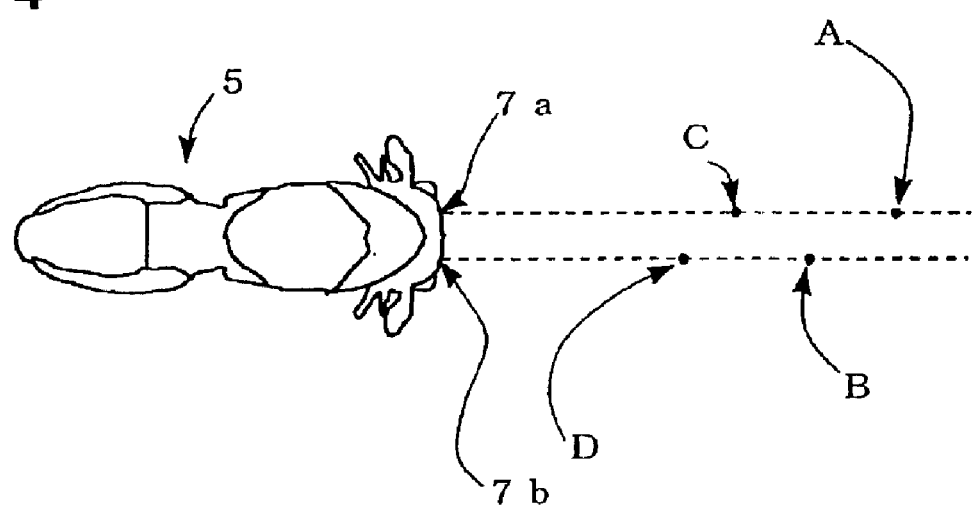
FIG. 4 is a plan of a motorcycle equipped with sensors of a system to monitor the course of an object going to collide which system makes the safety device to start to operate.
Figure 5:
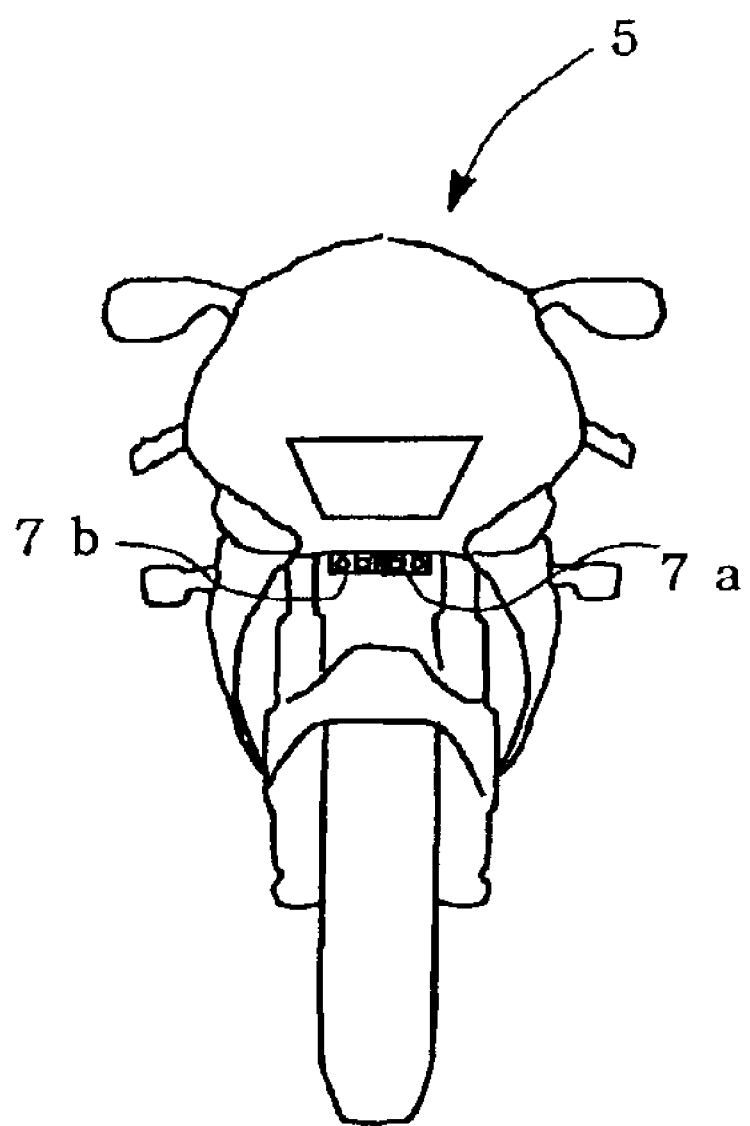
FIG. 5 is a front view of the motorcycle.
Figure 6A:
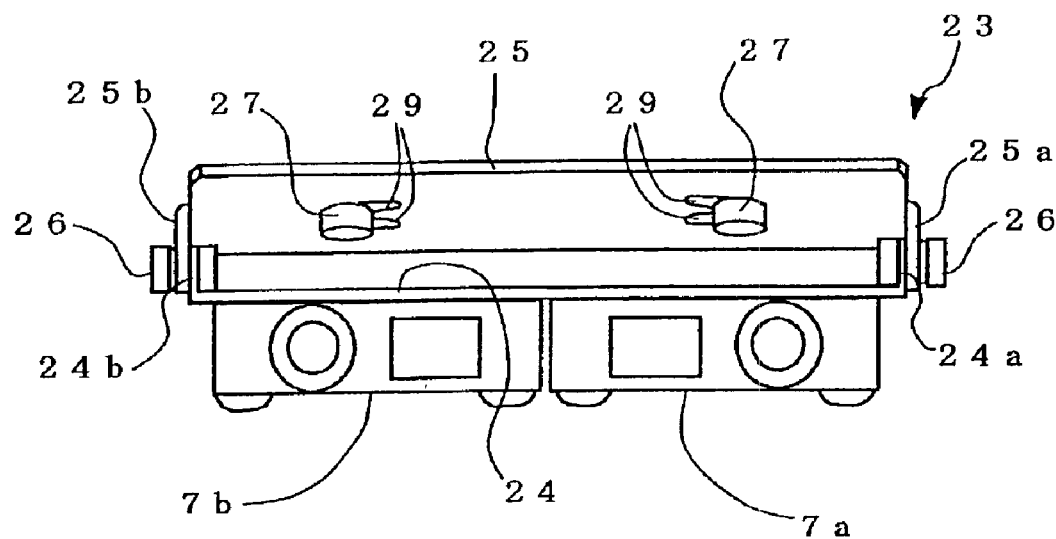
FIGS. 6(a) and 6(b) are enlarged views of FIG. 5.
Figure 6B:
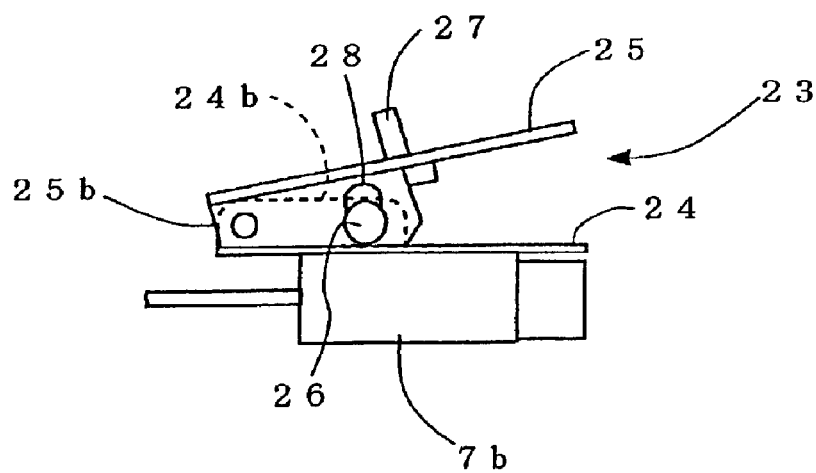

According to this safety device 1 against a crash for a motorcycle, by detecting the interval L between the motorcycle 5 and the obstacle 6 and relative velocity dV of the motorcycle 5 to the obstacle 6, it becomes possible to recognize the motorcycle 5 suddenly approaching the obstacle 6. Then, as the certain values of the interval L and the relative velocity dV are set at the values wherein it is impossible to avoid a crash, at point O of sudden approaching stage before the moment of impact as shown in FIG. 3, the opening device 4 operates whereby the air jacket 2 starts to expand, inner pressure of the air jacket 2 is raised by point Q when rider suffers first shock, and then the rider can be protected well. Further, as the crash of the motorcycle 5 to the obstacle 6 is to be perceived based on the relative velocity dV of the motorcycle 5 to the obstacle 6 in addition to the interval L of them, erroneous operation can be prevented in case where running the motorcycle 5 approaches the obstacle 6 such as a running car without danger of a crash, and reliability can be improved.

As the system to monitor the course of an object going to collide which system is equipped as the safety device against a crash for a motorcycle 1, the interval L is to be detected by two sensors 7a, 7b having two certain different sensing points A and C, B and D, arranged on two parallel straight lines extended from the motorcycle 5 in the direction of running. Further, distance from the motorcycle 5 to each of the sensing points A, B, C and D differs from each other, among these sensing points A, B, C and D the point A furthest from the motorcycle 5 is detected, the sensor 7a and the nearest point D is detected by the sensor 7b respectively, and the relative velocity dV is detected by using the time lag detected between the point A furthest from the motorcycle 5 and the nearest point D. Further, the control signal to make the safety device against a crash for a motorcycle 1 to start to operate is outputted in case, in addition to the first condition (condition of the interval L) and the second condition (condition of the relative velocity dV), the third condition where all of sensing points A, B, C and D are detected in order from the point A furthest from to the point D nearest to the motorcycle 5 is also fulfilled.

To do like this, as just detecting only the interval L between the motorcycle 5 and the obstacle 6 results in detecting the relative velocity at the same time and no other measuring is required, structure can be simplified and miniaturized. Here, the sensors can be replaced by single sensor as shown in FIGS. 8a, 8b and 8c to detect the points A, B and C. In this case, the interval L is to be detected by sensor 7 having two certain different sensing points A and B arranged on straight line extending from the motorcycle 5 in the direction of running, and the relative velocity dV is to be detected at steps 53 and 56 by using the time lag detected between the point A farther from and the point B nearer to the motorcycle 5. However, in case where two sensors 7a and 7b are used for detection, as the furthest point A and the nearest point D are to be respectively detected by different sensors, even in such a situation that either of the sensors accidentally operates in error by influence of diffused reflection and so on, occurrence of erroneous works of the whole system can be decreased. Further, as it is made to be required condition to output the control signal that all of more than one sensing point A, B, C and D are detected at steps 53, 56, 57 and 58 in order from the farthest point to the nearest point, erroneous work at step 10 can be avoided in such a situation that the motorcycle 5 approaches and steps aside from the obstacle 6 existing in the direction of running, for example, a situation that the motorcycle 5 approaches a side of and passes the obstacle 6 running ahead.

Figure 7:
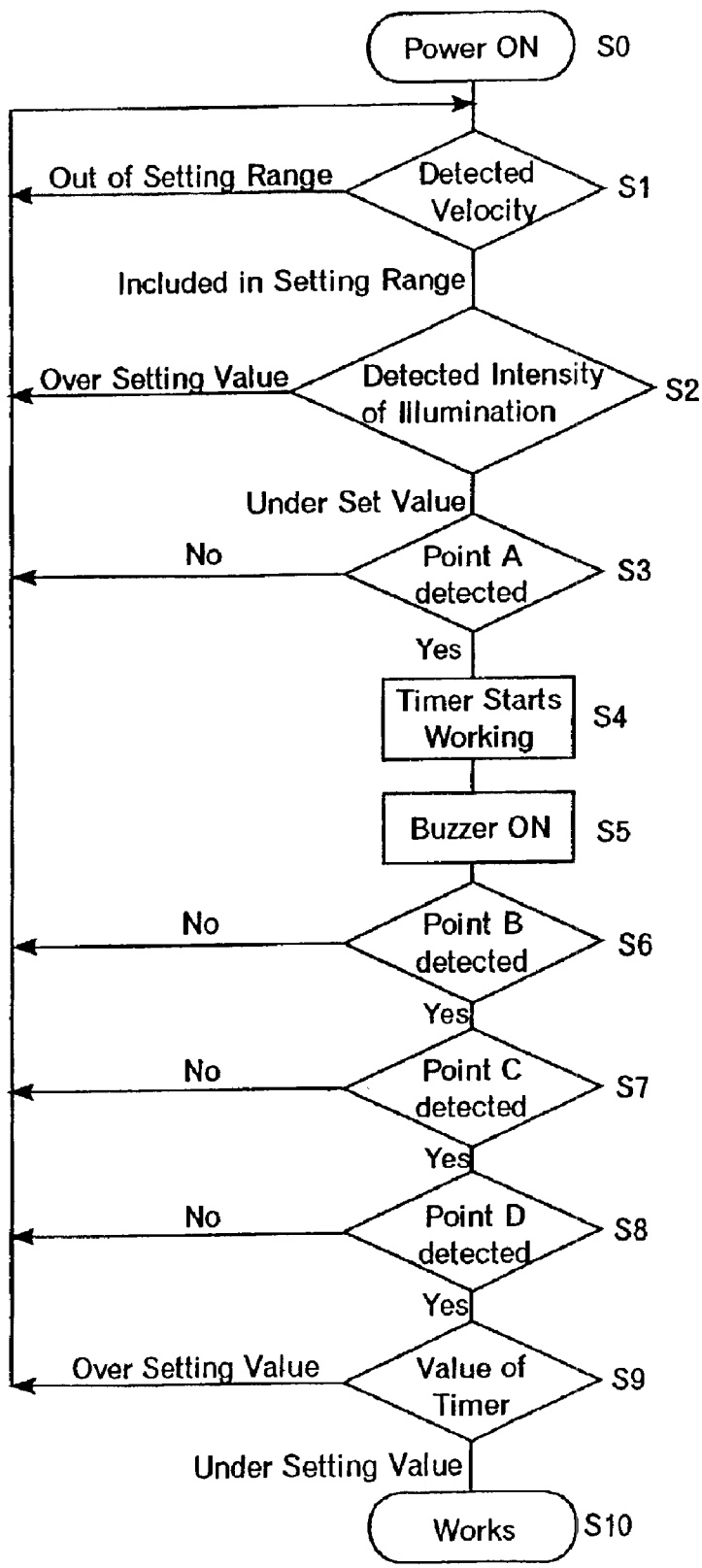
FIG. 7 is a flowchart from when the system to monitor the course of an object going to collide detects sensing points till when the system makes the safety device against a crash for a motorcycle to start operating.

As shown in FIG. 7, detection of the relative velocity dV using the time lag can be achieved in such a manner wherein after the point A is detected at S3 timer is made to operate at S4 and then after the point D is detected at S8 the value of the timer is considered if it is under setting value at S9. In this case, theoretically the setting value of the timer becomes the value obtained by equation L'/dV where L' is defined as interval of the point A and the point D. However, considering time loss in circuit and so on, it is preferred to define the setting value through actual working experiment and so on.

The sensors 7a, 7b are put on lower part of front cowling of the motorcycle 5 being sustained by supporting parts 23. The supporting parts 23 have a pair of plate members 24 and 25 bent on both sides. Each of side portions 24a and 25a, 24b and 25b of the plate members 24 and 25 are put together and fixed with screw 26. Then, the plate member 25 to be positioned upper is sustained by screw 27 on the cowling, and the sensors 7a, 7h are to be put on under the surface of the plate member 24 to be positioned lower. Further, because screw holes 28 and 29 piercing the plate member 25 for screw 26 and 27 are long holes, by adjusting fixing angle of the plate member 24 to the plate member 25 and fixing position of the plate member 25 to the cowling, positions of the sensors 7a and 7b are to be adjustable in the direction of upper, lower, right, and left. Here, there is no limitation in choosing a way of fixing, and it is possible to fix by using other well known ways.

As to sensors 7a and 7b, laser sensors are used. Though there is no limitation in selecting which type of sensor, it is preferred to select from laser sensor, infrared light sensor, ultrasonic wave sensor, LED sensor, or combination sensor of more than two of these sensors. To do like this, by using conventional sensors low cost production can be achieved. Here, at the laser sensor, the infrared light sensor and the LED sensor, the time required to detect the interval L is shorter than the time required at the ultrasonic wave sensor, and in same condition the time from when the safety device 1 against a crash for a motorcycle operates to the moment of impact can be made longer compared to the ultrasonic wave sensor. Therefore, they are preferable to use. However, as disadvantage, in the morning hours or in the evening hours when position of the sun is at a low angle, due to incidence of sunlight to sensing portion of the sensors, there is a possibility that the safety device 1 against a crash for a motorcycle may operate in error. On the other hand, at the ultrasonic wave sensor, the time from the moment of operation to the moment of impact becomes shorter and there is tendency of being influenced by wind easily. However, because of low possibility of erroneous operation due to sunlight, it can be preferably used in the morning or the evening when the laser sensor and the infrared light sensor is unusable. Therefore, it is preferred to use combination of more than two types of these sensors, because each of sensors compensates for weak points of other types of sensors and reliability of the device is improved.

The sensors 7a and 7b are equipped with means to detect intensity of illumination 10. Then, as shown in FIG. 7, in case where the intensity of illumination detected by the means to detect the intensity of illumination is out of setting range at S2, the sensors 7a and 7b are to be turned off and processes after S3 are to be canceled.

To do like this, in such a condition where the laser sensor is easily influenced by sunlight tends to operate in error, namely, a condition in the morning or the evening in which condition an angle of the sun is low, or other condition where diffused reflection tends to occur, erroneous operation of the sensors 7a and 7b can be avoided. Then, the laser sensor which shows superior characteristics as a detect means can be used effectively. Here, to set the means of detecting the intensity of illumination 10 there is no strict range of setting an angle as long as it is set facing in almost the same direction to which the sensing portion faces. However, it is not preferable that the angle to the sensing portion becomes high (or the sensors face right overhead) because there is a fear that the sensors 7a, 7b will operate in error even in the daytime when they should work normally.

It is preferred the certain distance of the interval L is from 1 to 3 meters. To do like this, at ordinary running condition of motorcycle, in spite of using conventional sensor, those are the laser sensor, the infrared light sensor, the ultrasonic wave sensor and the LED sensor, the crash can be perceived with good accuracy and enough time to get the air jacket 2 expanded can be obtained.

It is preferred that the certain value of the relative velocity dV is from 20 to 70 kilometers per hour. In this case, it is possible to monitor the course of a motorcycle suiting for actual conditions of ordinary running of motorcycles.

The motorcycle 5 is equipped with a means to detect velocity 33 and, as shown in FIG. 7, in case where the velocity of the motorcycle 5 detected by the means to detect velocity 33 is out of setting range at S1, processes after S3 are to be canceled. Accordingly, the opening device 4 is to operate in this case, in addition to the first condition and the second condition, the fourth condition where the velocity of the motorcycle 1 is in the range of certain values is also fulfilled.

To do this, by setting the lower limit of the velocity at which the control signal is outputted, unnecessary operation at low speed where the motorcycle 5 runs without danger can be prevented. Further, in most of cases where collision occurs at low speed, because it is quite often that the motorcycle can run to a safe place by itself without falling, a minor accident is prevented from developing to a serious accident by expanding air jacket 2 in such a case.

As to the means to detect velocity 33, a velocity pulse sending apparatus is used. The velocity pulse sending apparatus is fixed between a speedometer of the motorcycle 5 and a rotation transmitting wire connected to the speedometer. Then, rotation of the wire makes a rotor of the pulse sending apparatus to rotate and according to rate of the rotation detected by magnetic sensor or light sensor the pulse is to be outputted.

It is preferred that the certain value of said velocity is 15 kilometers per hour. To do like this, by setting the lower limit of the velocity at 15 kilometers per hour, it is possible to make the operating condition suit for actual conditions of ordinary running of motorcycles.

The motorcycle 5 is equipped with a spare sensor 31. Then working of the spare sensor becomes alternative condition of the first and the second conditions in case the first condition and the second condition are not fulfilled, and makes the opening device 4 operate.

To do like this, even on occasion when the sensors 7a and 7b detecting the first and the second conditions have difficulty operating, operation of the safety device against a crash for a motorcycle 1 is guaranteed and reliability of the whole device can be improved.

The spare sensor 31 is a combination of an acceleration sensor 31a and a contact sensor 31b.

To do like this, with the acceleration sensor 31a, the moment of impact of the motorcycle 5 to the obstacle 6 can be detected by using the shock force in any direction, that is, in front, back, right or left side. Further, with the contact sensor 31b, the moment of contact of the motorcycle 5 to the obstacle 6 can be detected. Then, as the sensors 7a and 7b which detect the obstacle 6 existing away from the motorcycle 5 approaches the motorcycle 5 and the sensor whose detecting condition differs from the sensors 7a and 7b are used at the same time, even on occasion when either of the sensors have difficulty operating, the crash of the motorcycle 5 to the obstacle 6 is surely detected and the reliability of the whole device can be further improved.

Because the acceleration sensor 31a should not be operated by shocks of falling sideways, sudden stopping, sudden starting or the like in condition at ordinary running of motorcycles but to work only by shock of the crash, it is preferred to detect a shock of over 10 G (G is gravitation). Here, as the acceleration sensor, a type of sensor composed of two piezo-electrodes being made to bimorph type and put on a steal plate may be used and at this sensor electrical change caused on the electrodes deformed by shock may be output.

The contact sensor 31b is preferred to have simpler structure than other sensors 7a, 7b and 31a. To do like this, it is possible to avoid such a situation that all of sensors do not work. At such a contact sensor, for example, a tape composed of two electrodes arranged to face each other being covered by PVC on their outer surface may be used, and the shock may be detected by electric current passing through the electrodes contacting each other by being pressed.

The operation of the spare sensor 31, the first condition, the second condition, and the fourth condition are recognized by a control device 32. To do like this, as each information detected by each of the sensors is processed properly by the control device 32, reliability of the whole device can be more improved.

At the control device 32, for example, a control board equipped with a central processing unit (CPU) can be used. To do like this, example data of accidents is memorized, and by comparing actual situation to this data proper works can be achieved.

Figure 2:
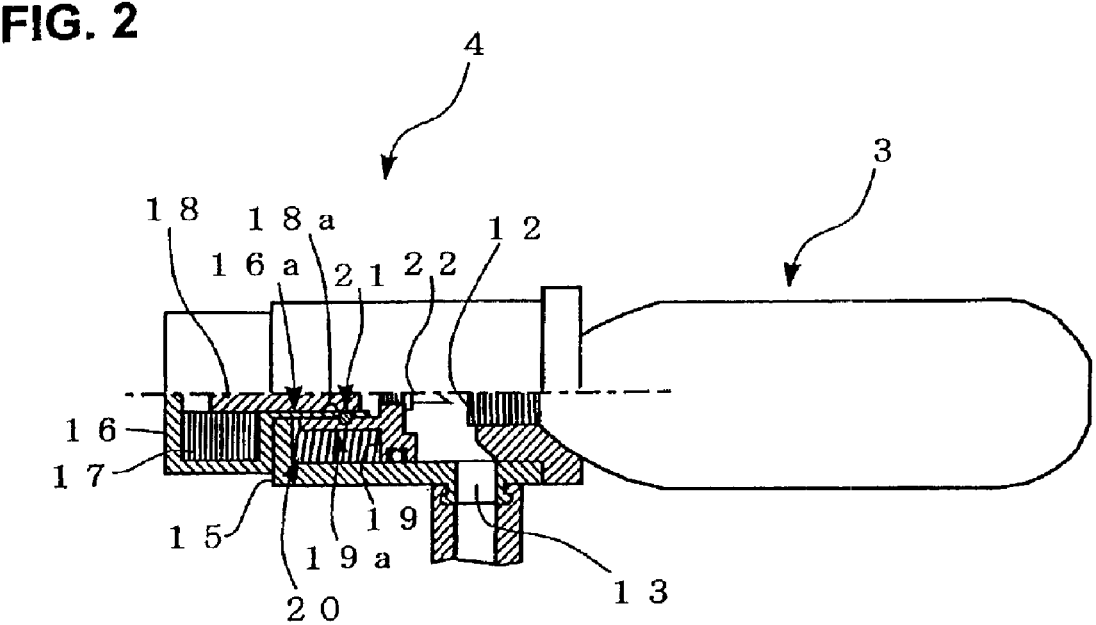
FIG. 2 is a partially cut out side view showing a cartridge and an opening device of the safety device against a crash.

As shown in FIG. 2, the opening device 4 has almost a cylindrical casing 15. Then, to one of opening mouth of the casing 15 a cartridge 3 is screwed, and on the other opening mouth a solenoid 16 is put via a ring-shaped projection 16a. The solenoid 16 includes an electromagnet 17, and a lock pin 18 extending from the ring-shaped projection 16a to inner hollow of the electromagnet 17 is inserted, it being possible to slide. On outer circumference of the ring-shaped projection 16a ring-shaped portion 19a of a slide member 19 is arranged, and further around the outer circumference of the ring-shaped portion 19a a spring 20 is interposed. The ring-shaped projection 16a and the ring-shaped portion 19a are fixed with each other at condition where a steel ball 21 is put in space formed by being put together a hole piercing wall of the ring-shaped projection 16a and a denting portion on inner wall face of the ring-shaped portion 19a. The slide member 19 is at condition of usually being pushed toward the cartridge 3 by the spring 20 and pushing the steel ball 21 back toward inside. Accordingly, as the lock pin 18 is projected toward the cartridge 3 by magnetism of the electromagnet 17 and a denting portion 18a formed on a circumference of the lock pin 18 comes to the position of being put on the steel ball, the steel ball 21 is moved to get into the denting portion 18a. Then, the ring-shaped projection 16a and the ring-shaped portion 19a are released from each other, the slide member 19 slides toward the cartridge 3, and an impact needle 22 screwed to the slides member 19 is to open the seal plate 12.

To do like this, it is possible to open the seal plate with a simple control.

Figure 10:
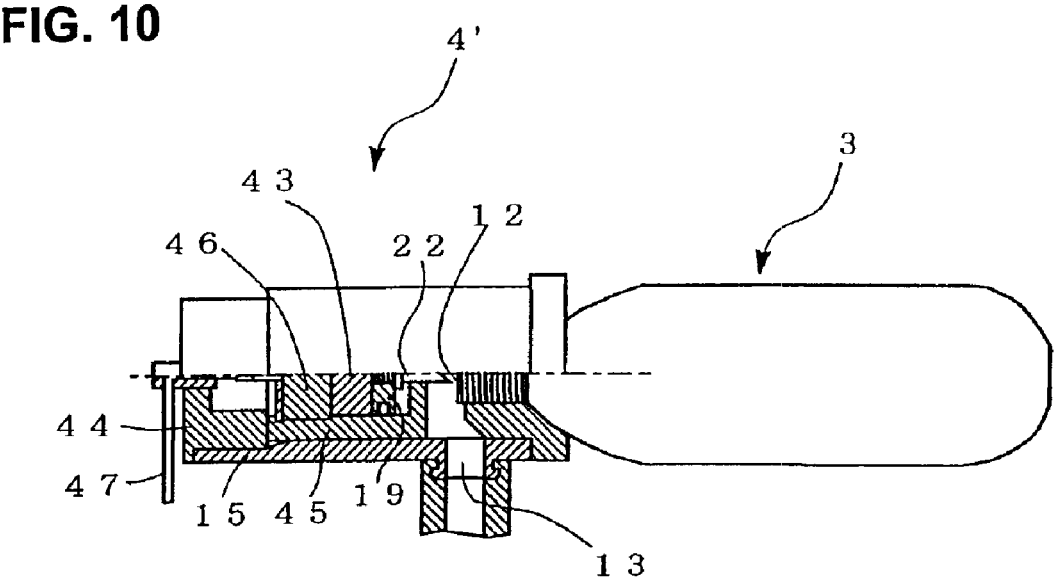
FIG. 10 is a partially cut out section showing another embodiment of an opening device of the safety device against a crash for a motorcycle in accordance with the present invention.

Preferably, the opening device 4 may be of a type including gunpowder and to open the seal plate by using the power of the explosion of the gunpowder. In FIG. 10, shown is another embodiment of an opening device as safety device against a crash for a motorcycle in accordance with the present invention. Here, in this embodiment, portions as substantially the same as described in said embodiment are put with same marks and their descriptions are omitted or simplified.

Almost cylindrical casing 15 of opening device 4' has a lead out portion 44 equipped at one of opening mouth and a cartridge 3 screwed into the other opening mouth. Further, inside of the casing 15, cylindrical-shaped inner wall member 45 having a bottom is arranged such that its bottom faces the cartridge 3 and its outer circumference adheres to inner wall of the casing 15. Inside of the inner wall member 45, a slide member 19, gunpowder 43 and detonator 46 are arranged in order from the bottom side. Here, the slide member 19 is so arranged as an impact needle 22 pierces the bottom wall of the inner wall member 45.

To the detonator 46 a lead 47 is connected. The lead 47 is made to go out of the opening device 4' through the lead out portion 44 and connected to the control device 32. Then, the detonator 46 is to be ignited by a control signal transmitted through the lead 47 and to explode the gunpowder 43.

As the gunpowder 43 explodes, the slide member 19 moves with the impact needle 22 by the power of the explosion and to open the seal plate 12.

To do like this, on situation where strong power is required to open the seal plate, necessary and sufficient power can be obtained.

As shown in FIG. 7, at detection of the sensing points in order from A to D, after detecting the point A, a warning buzzer is to make sound at S5. To do like this, by making the rider notice that the interval L of the motorcycle 5 to the obstacle 6 is of dangerous distance, a traffic accident involving a crash can be prevented. Here, at S9, in case where the timer shows lower value than the setting value, namely the relative velocity dV is such a low value that there is no danger to cause the crash, the process returns to S1. After returning to S1, on condition where the interval L is kept at shorter distance than the point A, for example, kept at distance whereby the point D can be detected, as required conditions at S1 and S2 are fulfilled processes of S3, S4 and S5 are immediately conducted and accordingly the buzzer continues to make sound.

Figure 8:
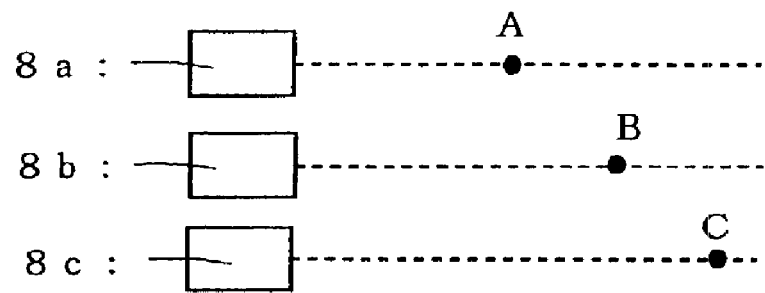
FIG. 8 is a plan view showing another embodiment of a sensor usable in the system to monitor the course of an object going to collide which sensor to be used as a set of plurality and having one sensing point.

Sensors used in the system to monitor the course of an object going to collide is not limited to having more than one sensing point, but, as shown in FIG. 8, more than one sensors 8a, 8b and 8c having respectively a certain sensing points A, B or C in direction to which the motorcycle 5 moves at distance from the motorcycle 5 which distances are different from each other, can be used. Here, the interval L is to be detected by at least one of the sensors 8a, 8b or 8c, the relative velocity dV is to be detected by using the time lag detected between the point C furthest from and the point A nearest to the motorcycle 5. To do like this, by using the sensor not having more than one sensing point, effect of decreasing the occurrence of accidental erroneous operation of the whole system, and effect of avoiding the erroneous operation in a situation that the motorcycle 5 approaches to and steps aside from an object existing in the direction movement can be obtained. Further, by increasing the number of the sensors, it is possible to improve the effect of decreasing the occurrence of accidental erroneous operation caused by influence of diffused reflection and so on.

Figure 9:
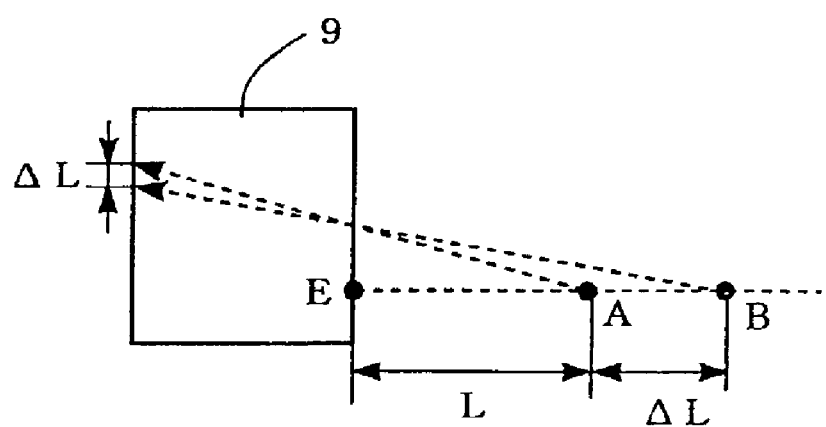
FIG. 9 is a plan view showing another embodiment of a sensor usable in the system to monitor the course of an object going to collide which sensor to be used singly and to measure distance between two different points.

In case where the sensor having more than one sensing point cannot be obtained but whole system is needed to be minimized, as shown in FIG. 9, the interval L can be detected by a sensor 9 which detects distance between two different points (EA, EB and so on), and the relative velocity dV can be detected by using variation dL of the interval L. To do like this, it is possible to use the sensor not having more than one sensing point. Further, as it does not use more than one sensor, it can be miniaturized.

Usage of the system to monitor the course of an object going to collide in accordance with the present invention, is not limited to starting a safety device against a crash for motorcycle. It may be used for other moving matters or other devices, for example, in such purpose as starting to decelerate devices to keep interval between cars at automatic cruising of a car.

EXAMPLES

Next described are examples of a system to monitor the course of an object going to collide in accordance with the present invention.

Figure 11:
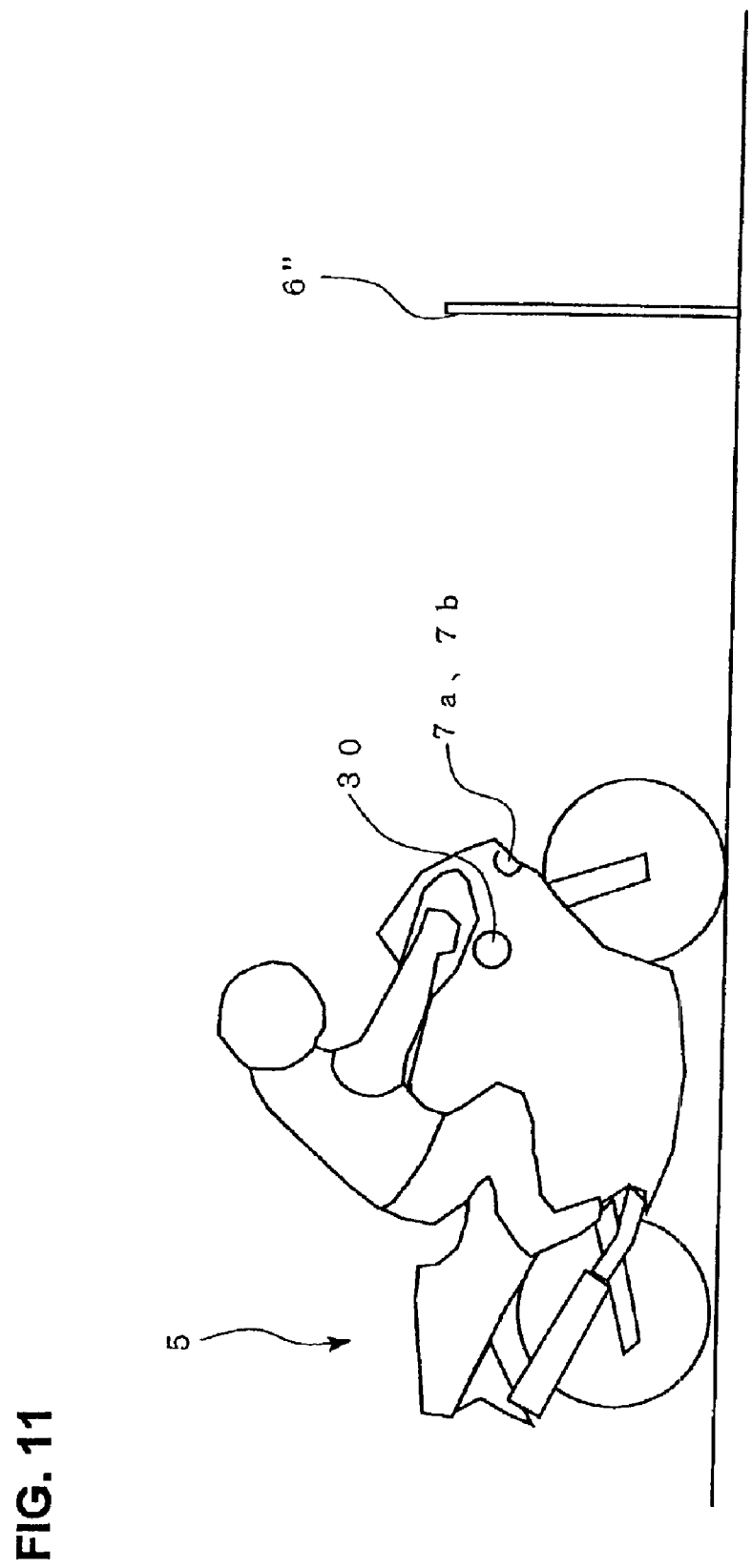
FIG. 11 is a rough drawing of simulated crash in examples of the system to monitor the course of an object going to collide in accordance with the present invention.
Figure 12:
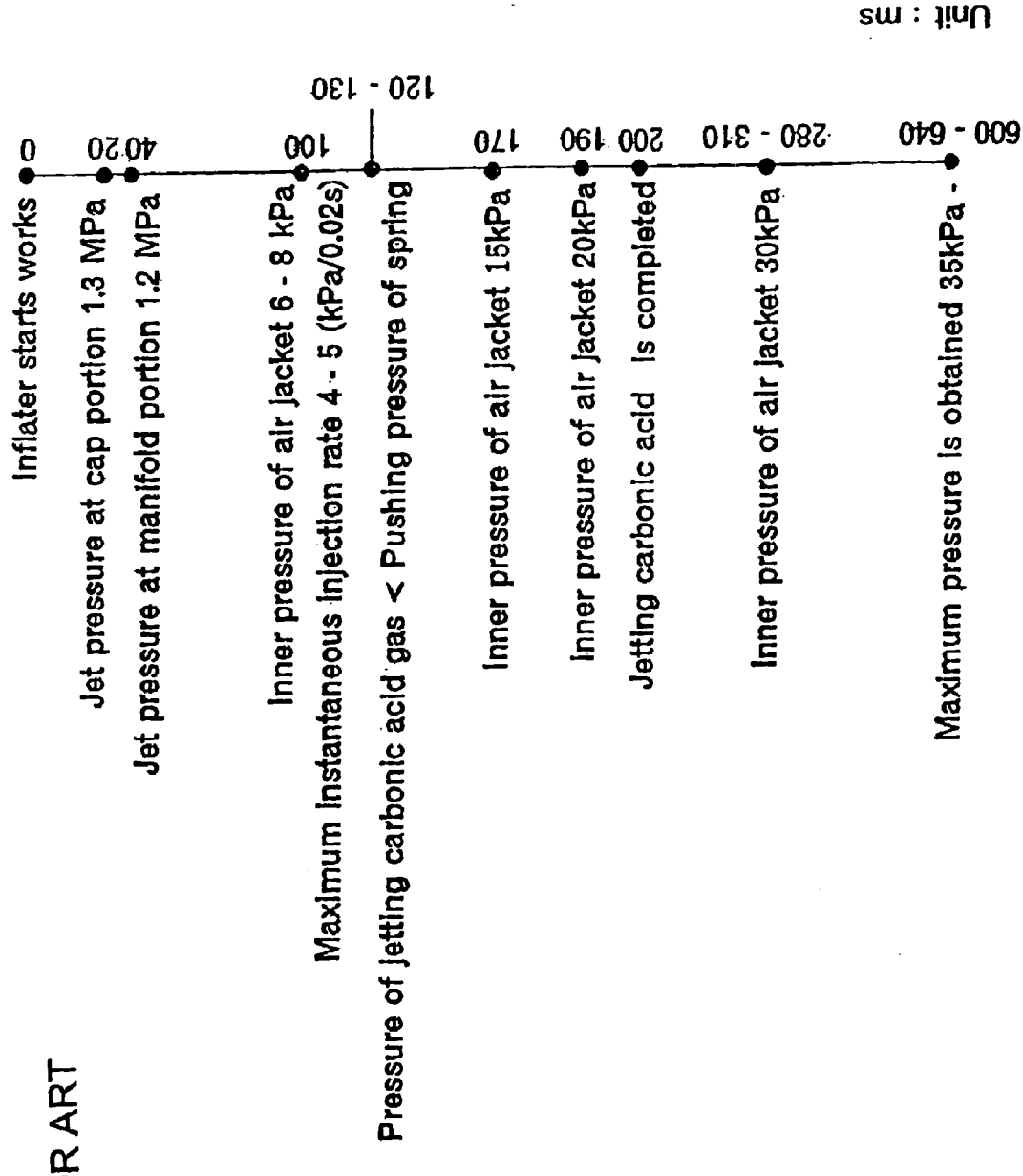
FIG. 12 is a graph showing the condition of the air jacket of the prior safety device against a crash as time passes from the moment when the inflater starts operating.
Figure 13:
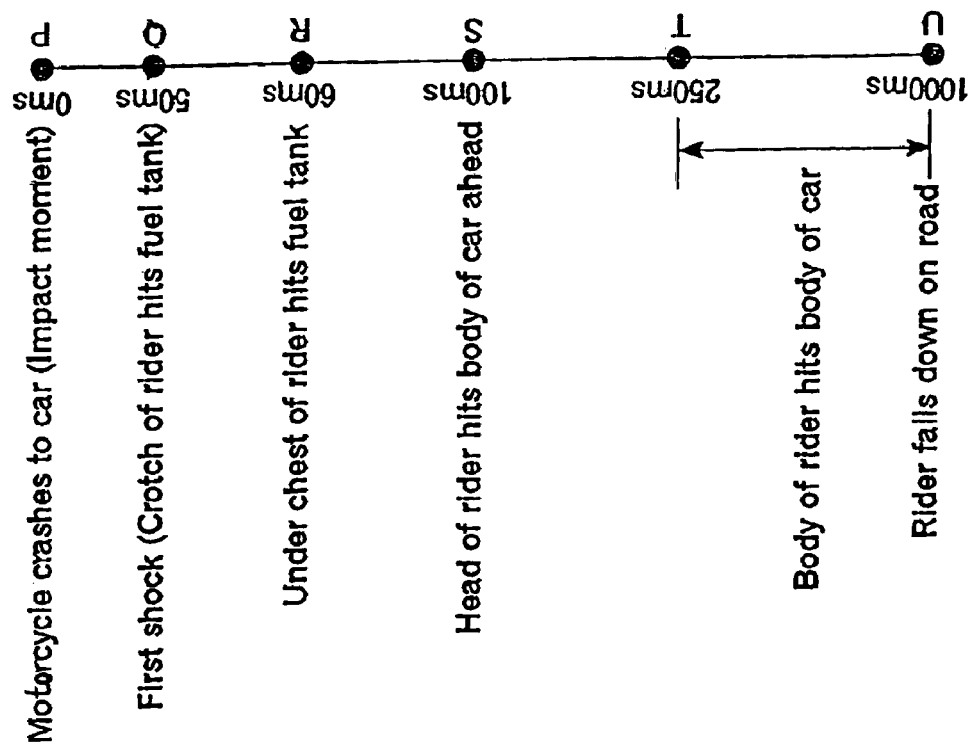
FIG. 13 is a graph showing the condition of a rider of a motorcycle at a crash of the motorcycle with a car as time passes from the moment when the inflater starts operating.

These examples are for verifying whether the system to monitor the course of an object going to collide properly works at actual running of a motorcycle equipped with the system. For verification of proper works, as shown in FIG. 11, a piece of corrugated cardboard 6" were put ahead of the motorcycle beforehand, and then it was checked whether signal would be outputted properly at simulated crashing condition made by running the motorcycle 5 to knock down the corrugated cardboard 6". Here, this simulated crash is conducted using soft corrugated cardboard without any danger to a rider. After proper operation at impact was verified, then the motorcycle 5 was made to approach a running car, and it was checked the signal was not outputted in error. Here the approaching a car was conducted by a car driven by staffs of these examples at well-communicated situation without any danger.

In examples, LV-21 and LV-H32 (Products of KEYENCE CORPORATION) was used as sensors. A sequencer is used to conduct signal output control based on the recognition of detecting the sensing points or based on evaluation of the timer value compared to the setting value. As the sequencer KV-10AR (Products of KEYENCE CORPORATION) was used. Signal output at the simulated crash was checked by flashing indication light 30 (refer FIG. 11) settled on a side face of the motorcycle using the output. For checking, scenes of the simulated crash were recorded by a video camera, and the time from flash to the moment of impact was checked through pictures. As the indication light, a strobe was used. Signal output at normal running was checked by counting times of output. As a counter H7GP-CDB (Products of OMRON CORPORATION) was used.

Shown in Table 1 are conditions of the examples.

TABLE 1

|  |  | Example 1 | Example 2 | Example 3 |
|---|---|---|---|---|
| Running time zone |  | PM 3:00–PM 5:00 | PM 4:00–PM 6:30 | AM 9:30–PM 12:30 |
| Weather |  | Clear | Clear | Clear |
| Running area |  | Suburbs | High way Urban area | High way Urban area |
| Distance from sensor to sensing points | A | 2.1 m | 2.5 m | 2.1 m |
|  | B | 1.9 m | 2.3 m | 1.9 m |
|  | C | 1.6 m | 1.9 m | 1.7 m |
|  | D | 1.2 m | 1.7 m | 1.5 m |
| Height of position where sensor fixed |  | 746 mm | 715 mm | 715 mm |
| Height of sensing points |  | 580 mm | 560 mm | 560 mm |
| Interval of points A and D |  | 900 mm | 800 mm | 600 mm |
| Interval of Light source light axes |  | 67 mm | 67 mm | 67 mm |
| Sensing point A |  | 140 mm | 40 mm | 40 mm |
| Setting value of timer |  | 0.05 S (65 km/h) | 0.05 S (60 km/h) | 0.08 S (27 km/h) |
| Running distance |  | 58.2 km | 104.1 km | 62.3 km |

In all of examples 1 to 3, proper output was checked at the simulated crash.

At running test of the example 1, it was checked that the counter had worked once. This work occurred at running behind a trailer keeping normal distance from the trailer and it was considered that a source may be diffused reflection caused by uneven surface of back side face of the trailer. As a countermeasure for this phenomenon, it was verified that a means to detect intensity of illumination added to the system was enable to decrease the occurrence of erroneous operation not only caused by sunlight but also caused by diffused reflection.

At running test of the example 2, the counter had not worked.

At running test of the example 3, it was checked that the counter had worked five times. These works were caused in condition where the motorcycle 5 was driven weaving in right and left and approaching the car staffs driving, and it was considered not to occur in normal running condition.

According to these examples, it can be verified that the system to monitor the course of an object going to collide in accordance with the present invention has high reliability of working with outputting signal only at a crash but not at normal running. Further, a means to detect intensity of illumination is verified to be effective in preventing erroneous operation of laser sensor.

Further, inner pressure of an air jacket changes as shown in FIG. 3 and Table 2 in case where the system to monitor the course of an object going to collide of the examples 4 is used for its control.

TABLE 2

|  | Jacket Inner Pressure (kPa) | |
|---|---|---|
| Description of Condition | Present Invention | Prior |
| O Starting works of safety device against clash which device relates to the present invention | 0 | — |
| P Motorcycle collides to obstacle | 7–10 | 0 |

TABLE 2-continued

| | Jacket Inner Pressure (kPa) | |
|---|---|---|
| Description of Condition | Present Invention | Prior |
| Q Crotch of rider hits fuel tank | 15–20 | 0.2–0.5 |
| R Under chest of rider hits fuel tank | 20–25 | 0.6–2 |
| S Head of rider hits obstacle | 25 over | 6–8 |
| T Body of rider hits obstacle | Maximum | 23 over |
| U Rider falls down on road | ↓ | Maximum |

Accordingly, it is possible to protect a rider well.

EFFECTS OF THE INVENTION

According to the system to monitor the course of an object going to collide in accordance with the present invention, by detecting the interval between an object going to collide and an objected to be collided with and relative velocity of the object going to collide to the object to be collided with (obstacle), it becomes possible to recognize the object going to collide suddenly approaching the object to be collided with. Then, as the certain values of the interval and the relative velocity are set at the values wherein it is impossible to avoid a crash, the control signal is output at sudden approaching stage before the moment of impact, and by using the control signal it becomes possible to take action against the crash in early stage of a traffic accident involving the crash. Further, as the crash of the object going to collide to the object to be collided with is to be perceived based on the relative velocity of the object going to collide to the object to be collided with in addition to the interval between them, it is possible to avoid the control signal from outputting in error (erroneous works) in case where both moving the object going to collide and moving the object to be collided with such as running cars approach without danger of crashing, and reliability can be improved.

According to the present invention, as just detecting only the interval between the object going to collide and the object to be collided with results in detecting the relative velocity at the same time and no other measuring is not required, the structure can be simplified and miniaturized.

According to the present invention, as the furthest point and the nearest point are respectively detected by different sensors, even in such a situation that either of the sensors accidentally operates in error by influence of diffused reflection and so on, the occurrence of erroneous operation of the whole system can be decreased. Further, as it is made to be required condition to output the control signal that all of more than one sensing point are detected in order from the farthest point to the nearest point, erroneous operation can be avoided in such a situation that the object going to collide approaches to and steps aside from an object existing in the direction of movement, for example, a situation that a motorcycle approaches a side of and passes a car running ahead.

According to the present invention, by using the sensor not having more than one sensing point, effect of decreasing the occurrence of accidental erroneous operation of the whole system, and effect of avoiding the erroneous operation in a situation that the object going to collide approaches to and steps aside from an object existing in the direction of movement can be obtained. Further, by increasing the number of the sensors, it is possible to improve the effect of decreasing the occurrence of accidental erroneous operation caused with influence of diffused reflection and so on.

According to the present invention, it is possible to use the sensor not having more than one sensing point. Further, as it does not use more than one sensor, it can be miniaturized.

According to the present invention, by using conventional sensors low cost production can be achieved. Further, by using combination of more than two types of sensors, each of sensors compensates for weak points of other types of sensors and reliability can be improved.

According to the present invention, such a condition where the laser sensor is easily influenced by sunlight tends to operate in error can be detected by using the means to detect intensity of illumination, and it is possible to turn off the laser sensors and to prevent the laser sensor from erroneous operation. Then, the laser sensor which shows superior characteristics as a detect means can be used effectively.

According to the present invention, at ordinary running condition of a motorcycle, in spite of using conventional sensors, those are laser sensor, infrared light sensor, ultrasonic wave sensor or LED sensor, the crash can be perceived with good accuracy and enough time to take action against the crash can be obtained by the impact of the motorcycle.

According to the present invention, it is possible to monitor the course of a motorcycle suiting for actual conditions of ordinary running of motorcycles.

According to the present invention, by setting the lower limit of the velocity at which the control signal is output, unnecessary operation at low speed where the motorcycle runs without danger can be prevented. Further, in most cases where collision occurs at low speed, because it is quite often that the motorcycle can run to a safe place by itself without falling, a minor accident is prevented from developing to a serious accident by expanding air jacket in such a case.

According to the present invention, by setting the lower limit of the velocity at 15 kilometers per hour, it is possible to make the working condition suit for actual conditions of ordinary running of motorcycles.

According to the safety device against a crash for a motorcycle in accordance with the present invention, by setting the lower limit of the velocity at 15 kilometers per hour, it is possible to make the working condition suit for actual conditions of ordinary running of motorcycles.

According to the present invention, even on occasion when the sensor (main sensor) detecting the first and second conditions have difficulty operating, operation of the safety device against a crash for motorcycle is guaranteed and reliability of the whole device can be improved. Further, by taking a spare sensor whose type differs from the main sensor, it becomes possible to make the spare sensor compensate for weak points of the main sensor, and reliability can be further improved.

According to the present invention, with the acceleration sensor, the moment of impact of the motorcycle to the obstacle can be detected by using the shock force in any direction, that is, in front, back, right or left side. Further, with the contact sensor, the moment of contact of the motorcycle to the obstacle can be detected. Then, as the main sensor which detects the obstacle existing at a distance from the motorcycle approaches the motorcycle and the sensor whose detecting condition differs from the main sensor are used at the same time, even on occasion when either of the sensors have difficulty operating, the crash of the motorcycle to the obstacle is surely detected and the reliability of whole device can be further improved.

According to the present invention, as each information detected by each of the sensors is processed properly by the control device, reliability of the whole device can be more improved.

According to the present invention, it is possible to open the seal plate with simple control.

According to the present invention, on situation where strong power is required to open the seal plate, necessary and sufficient power can be obtained.

What is claimed is:

1. A safety device against crash for a motorcycle characterized in that an air jacket (2), a cartridge (3), and an opening device (4) are provided, said air jacket (2) having an airbag (11), said cartridge (3) being filled with pressurized gas and having an opening sealed up by a seal plate (12) said opening device (4) for opening said seal plate (12) of said cartridge (3) and provided with a gas flow-out mouth (13), said airbag (11) being connected to said opening device (4), and wherein before a moving motorcycle (5) collides with an obstacle (6) ahead, said opening device (4) operates when a first condition where an interval (L) between said moving motorcycle (5) and said obstacle (6) becomes a certain distance, and a second condition where a relative velocity (dV) of said moving motorcycle (5) toward said obstacle (6) becomes greater than a certain value, are both fulfilled, a spare sensor (31) is provided on said motorcycle (5), said spare sensor sensing an alternative condition to said first and second conditions when said first and second conditions are not fulfilled; and said spare sensor (31) is a combination of an acceleration sensor (31a) and a contact sensor (31b).

2. The safety device against crash for a motorcycle as claimed in claim 1 wherein said first condition, said second condition, a third condition, and an operation of said spare sensor (31) are recognized by a control device (32).

3. The safety device against crash for a motorcycle as claimed in claim 1 wherein said opening device (4) has a solenoid (16) and operation of said solenoid (16) opens said seal plate (12).

4. The safety device against crash for a motorcycle as claimed in claim 1 wherein said opening device (4) includes gunpowder (23) and opens said seal plate (12) by exploding said gunpowder (23).

* * * * *